(12) United States Patent
Kim et al.

(10) Patent No.: US 9,435,887 B2
(45) Date of Patent: Sep. 6, 2016

(54) OBJECT DETECTING APPARATUS, AND METHOD OF OPERATING THE SAME

(71) Applicant: Hyundai Mobis Co., Ltd., Seoul (KR)

(72) Inventors: Young shin Kim, Yongin-si (KR); Won gyum Kim, Yongin-si (KR); Soo yong Ryu, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 14/697,097

(22) Filed: Apr. 27, 2015

(65) Prior Publication Data

US 2016/0116593 A1   Apr. 28, 2016

(30) Foreign Application Priority Data

Oct. 23, 2014   (KR) ........................ 10-2014-0144321

(51) Int. Cl.
| | | |
|---|---|---|
| G01S 17/06 | (2006.01) | |
| B60T 7/22 | (2006.01) | |
| G01P 3/36 | (2006.01) | |
| G06K 9/00 | (2006.01) | |
| G06T 7/00 | (2006.01) | |

(52) U.S. Cl.
CPC ............... *G01S 17/06* (2013.01); *B60T 7/22* (2013.01); *G01P 3/36* (2013.01); *G06K 9/00805* (2013.01); *G06T 7/0081* (2013.01); *G06T 7/0097* (2013.01); *G06T 2207/10028* (2013.01); *G06T 2207/20021* (2013.01); *G06T 2207/30261* (2013.01)

(58) Field of Classification Search
CPC ... G01S 17/06; G06T 7/0081; G06T 7/0097; G06T 2207/10028; G06T 2207/30261; G06T 2207/20021; B60T 7/22; G01P 3/36; G06K 9/00805
USPC ..................... 701/36, 70, 300–301
See application file for complete search history.

(56) References Cited

U.S. PATENT DOCUMENTS

| | | | | |
|---|---|---|---|---|
| 6,498,972 B1* | 12/2002 | Rao | ........................ | B60Q 1/38 701/301 |
| 7,453,374 B2* | 11/2008 | Koike | ................... | B60Q 9/008 180/167 |
| 7,729,858 B2* | 6/2010 | Koike | ................... | B60W 30/08 340/436 |
| 8,380,426 B2* | 2/2013 | Konijnendijk | ........ | G01S 13/723 701/301 |
| 2004/0189512 A1* | 9/2004 | Takashima | ............ | G01S 13/867 342/70 |
| 2010/0204964 A1* | 8/2010 | Pack | ..................... | G06T 7/0057 703/1 |
| 2011/0115615 A1* | 5/2011 | Luo | ........................... | B60R 1/00 340/436 |
| 2012/0069185 A1* | 3/2012 | Stein | ................. | G06K 9/00805 348/148 |
| 2016/0016560 A1* | 1/2016 | Parker | .................. | B60W 30/09 701/70 |

* cited by examiner

*Primary Examiner* — Thomas Tarcza
*Assistant Examiner* — Tyler J Lee
(74) *Attorney, Agent, or Firm* — H.C. Park & Associates, PLC

(57) ABSTRACT

An object detecting apparatus and an operating method thereof are disclosed. An apparatus for detecting an object includes: a sensor unit including a light distance and ranging (LiDAR) sensor for collecting LiDAR data and a camera sensor for collecting image data; an area dividing unit configured to divide a common detection area of the LiDAR sensor and the camera sensor into a plurality of areas; a data analyzing unit configured to analyze the LiDAR data to extract a first object information and/or analyze the image data to extract a second object information; and a sensor signal converging unit configured to determine whether a dangerous object exists for each of the divided areas based on the first object information and/or the second object information.

16 Claims, 9 Drawing Sheets

OBJECT DETECTING APPARATUS, AND METHOD OF OPERATING THE SAME

CROSS-REFERENCE TO RELATED APPLICATION

This application claims priority from and the benefit of Korean Patent Application Number 10-2014-0144321 filed Oct. 23, 2014, which is hereby incorporated by reference for all purposes as if fully set forth herein.

BACKGROUND

1. Field

Exemplary embodiments relate to an object detecting apparatus, and a method of operating the same, and more particularly, exemplary embodiments relate to an object detecting apparatus, which diversifies the detection area using a plurality of sensors to improve performance of detecting an object existing around a vehicle, and a method of operating the same.

2. Discussion of the Background

A technique related to an advanced driver assistance system (ADAS) has recently gained interest with vehicle manufacturers and consumers.

The ADAS is a system for implementing various safety functions and convenience functions for drivers and pedestrians, and a representative example thereof is an autonomous emergency braking (AEB) system.

The AEB system refers to a system that detects a situation where an object, such as another vehicle existing within a predetermined distance from a front side of a vehicle, decreases a speed or suddenly appears by using a sensor, such as a light detection and ranging (LiDAR) sensor or a camera sensor that is capable of detecting an object, to control the vehicle so that the vehicle is automatically braked even if a driver does not operate a brake. The AEB system is an advanced version of a passive method of simply providing an alarm and making a driver take measures by himself/herself in the related art.

LiDAR sensors have a higher object detection rate and higher distance accuracy, but have lower detection reliability than camera sensors. By contrast, camera sensors have higher reliability with respect to object detection than LiDAR sensors, but have slightly lower distance accuracy and slightly lower detection rates for actual objects. Accordingly, when an object is complementarily detected by using both LiDAR and camera sensors, it is possible to further decrease a possibility of an operation failure and an erroneous operation of the AEB system and the like.

However, the related art of Korean Patent Application Laid-Open No. 10-2010-0111543: Method and Apparatus for Recognizing Vehicle (published on Oct. 15, 2010) discloses only the technology of recognizing a front vehicle by simply combining a LiDAR sensor and a camera sensor, and does not refer to technology of diversifying a common detection area of the LiDAR sensor and the camera sensor and processing data in accordance with a characteristic of each area to improve an object detection rate and/or the reliability of the object detection. The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiment provides an object detecting apparatus, which divides a common detecting area of a LiDAR sensor and a camera sensor into a plurality of sub areas to improve an object detection rate and improve the reliability of object detection, and a method of operating the same.

Additional aspects will be set forth in the detailed description which follows, and, in part, will be apparent from the disclosure, or may be learned by practice of the inventive concept.

One or more exemplary embodiments of the present invention provide an apparatus for detecting an object, including: a sensor unit including a LiDAR sensor for collecting LiDAR data and a camera sensor for collecting image data; an area dividing unit configured to divide a common detection area of the LiDAR sensor and the camera sensor into a plurality of areas; a data analyzing unit configured to analyze the LiDAR data to extract first object information and analyze the image data to extract second object information; and a sensor signal converging unit configured to determine whether a dangerous object exists for each of the divided areas based on the first object information and the second object information.

The sensor signal converging unit may include: a mapping or coordinate converging module configured to convert the LiDAR data and the image data into data for the same coordinate plane; and an object comparing module configured to compare the first object information included in the LiDAR data and the second object information included in the image data on the coordinate plane, and determine whether a dangerous objects exists for each of the divided areas based on a result of the comparison between the first object information and the second object information.

When the first object information and the second object information have a difference less than a predetermined threshold value as a result of the comparison by the object comparing module, the sensor signal converging unit may determine that a first object and a second object are the same object.

The first object information may be center coordinates of a first object for the coordinate plane, and the second object information may be center coordinates of a second object for the coordinate plane.

The multiple areas divided by the area dividing unit may include an area above the ground (i.e., ground non-included area) and an area including the ground (i.e., ground included area).

When the data analyzing unit extracts the first object information from the LiDAR data for the ground non-included area, the sensor signal converging unit may determine that a dangerous object exists in the ground non-included area.

The sensor unit may adjust an object detection threshold value of the camera sensor based on a predetermined sensitivity adjustment condition.

The apparatus may further include a vehicle information collecting unit configured to collect speed information about the vehicle.

The data analyzing unit may insert relative speed information about the vehicle into the first object information and the second object information, and the sensor signal converging unit may determine whether the first object information about the ground included area is related to a stopped object based on the relative speed information, and when it is determined that the first object information is related to a moving object, the sensor signal converging unit may determine that a dangerous object exists in the ground included area.

The data analyzing unit may insert relative speed information of an object relative to the vehicle into the first object information and/or the second information, and the sensor signal converging unit may determine that a dangerous object exists in the ground included area when the first object information about the ground included area is about a stopped object and the second object information about the stopped object is included in the image data.

The data analyzing unit may extract lane information included in the image data, and when the first object information for the ground included area is related to a stopped object existing out of the lane boundary, the sensor signal converging unit may determine that a dangerous object exists in the ground included area.

The apparatus may further include a driving unit configured to operate an autonomous emergency braking (AEB) system of the vehicle when the sensor signal converging unit processes that a dangerous object exists.

The apparatus may further include a synchronizing unit configured to synchronize the LiDAR data transmitted from the LiDAR sensor and the image data transmitted from the camera sensor based on a time, in which the sensor signal converging unit may determine whether a dangerous object exists for each of the divided areas based on the first object information and the second object information when the synchronization is completed.

Another exemplary embodiment of the present invention provides a method of operating an apparatus for detecting an object, including: generating LiDAR data by using a LiDAR sensor and image data by using a camera sensor; dividing a common detection area of the LiDAR sensor and the camera sensor into a ground non-included area and a ground included area; analyzing the LiDAR data to extract first object information and analyzing the image data to extract second object information; determining whether a dangerous object exists for each of the ground non-included area and the ground included area based on a result of the analysis; and operating an autonomous emergency braking (AEB) system of a vehicle when it is determined that the dangerous object exists.

The step of determining may include determining that a dangerous object exists in the ground non-included area when the first object information is included in the LiDAR data for the ground non-included area.

The step of determining may include determining that a dangerous object exists in the ground included area when an object related to the first object information and an object related to the second object information are the same based on the first information of the LiDAR data and the second object information of the image data.

The method may further include adjusting an object detection threshold value of the camera sensor based on a predetermined sensitivity adjustment condition. The method may further include collecting speed information about a vehicle, in which the step of determining may include determining whether the first object information included in the LiDAR data for the ground included area is related to a stopped object based on the speed information about the vehicle, and determining that a dangerous object exists in the ground included area when the first object information is related to a moving object.

The analyzing may include extracting lane information included in the image data, and the determining may include processing that a dangerous object exists in the ground included area when the first object information included in the LiDAR data for the ground included area is a stopped object existing out of a lane boundary.

The step of determining may include determining that a dangerous object exists in the ground included area when the first object information about the ground included area is about a stopped object and the second object information about the stopped object is included in the image data.

According to the exemplary embodiments of the present invention, it is possible to provide the object detecting apparatus that is capable of increasing an object detection rate and improving reliability of object detection by dividing a common detection area of the LiDAR sensor and the camera sensor into a plurality of sub areas and applying a data processing method in accordance with a characteristic of each sub area, as well as the operating method thereof.

It is also possible to further improve object detection reliability by adjusting an object detection threshold value of the camera sensor according to a predetermined condition.

It is also possible to decrease a possibility that a factor, such as a pavement marker, disturbing accurate object detection may cause an erroneous operation of an autonomous emergency braking (AEB) system by determining whether an object moves or is stopped based on speed information about a vehicle.

It is also possible to improve accuracy in determining a possibility of a collision with a stopped object by extracting lane information from image data.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION

Figure 1:
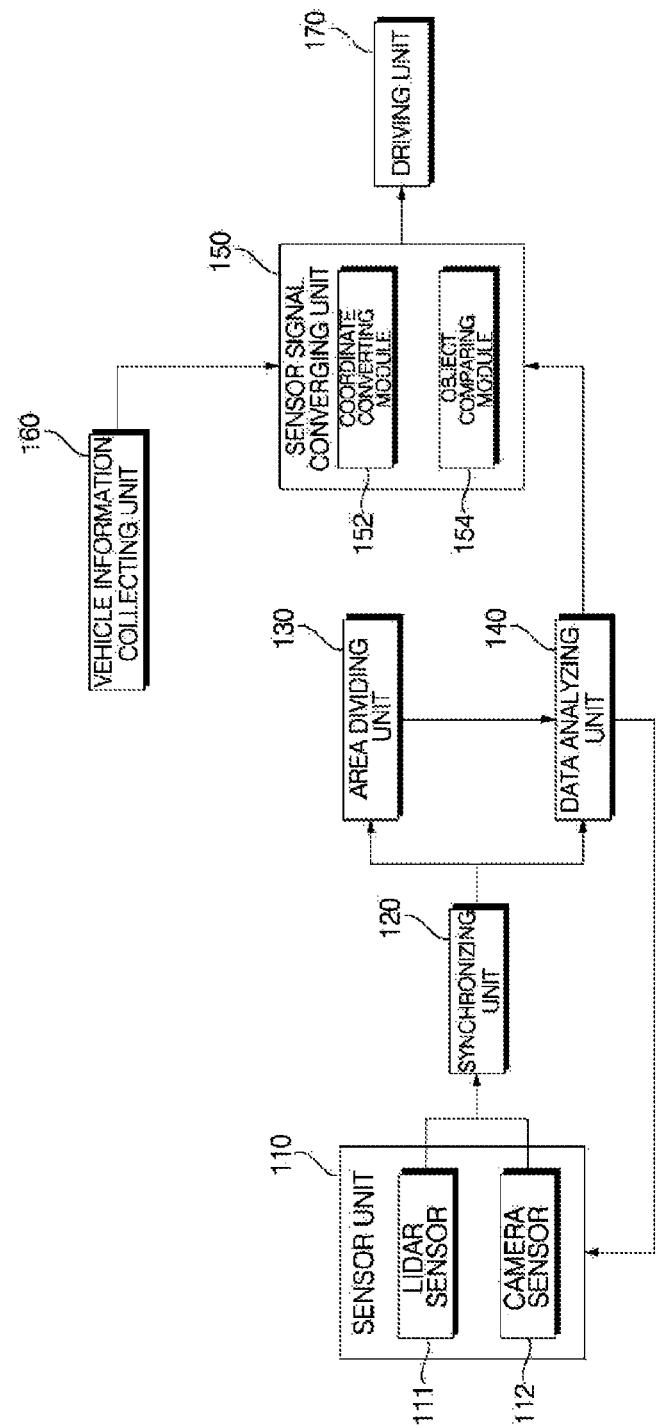
FIG. 1 is a block diagram illustrating an object detecting apparatus according to an exemplary embodiment of the present invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of elements may be exaggerated for clarity and descriptive purposes. Also, like reference numerals denote like elements.

When an element is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this u) disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, etc., these elements, components, regions, etc., should not be limited by these terms. These terms are used to distinguish one element, component, region, etc., from another element, component, region, etc. Thus, a first element, component, region, etc. discussed below could be termed a second element, component, region, etc., without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2A:
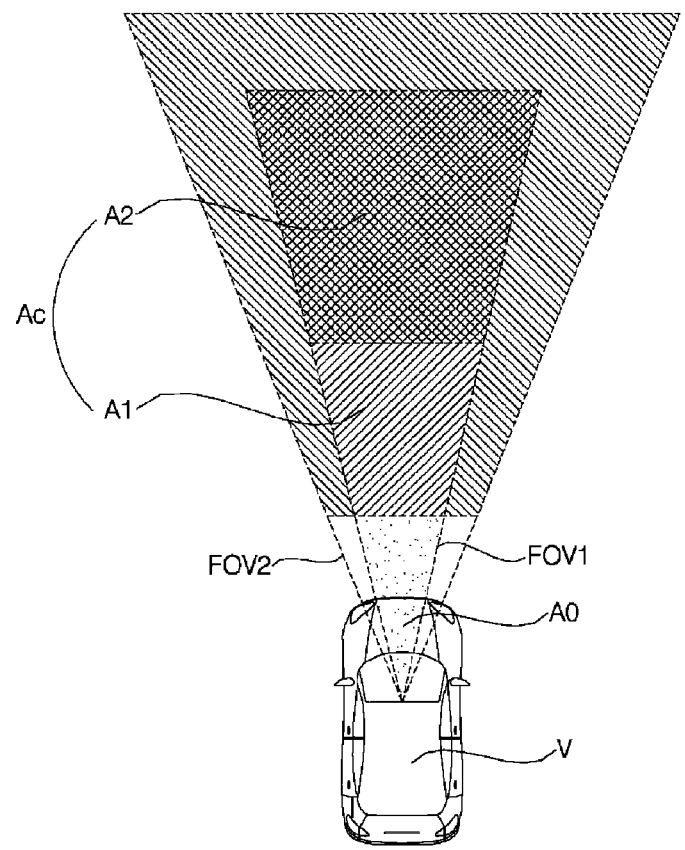
FIGS. 2A and 2B are diagrams illustrating an example of detection areas of a LiDAR sensor and a camera sensor.
Figure 2B:
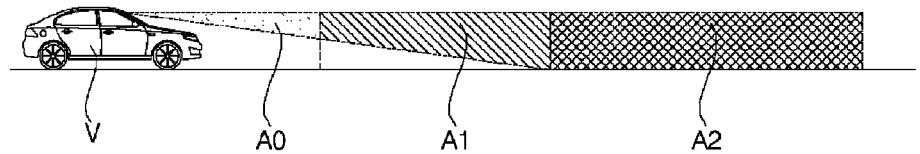

FIG. 1 is a block diagram illustrating an object detecting apparatus according to an exemplary embodiment of the present invention, and FIGS. 2A and 2B are diagrams illustrating an example of detection areas of a LiDAR sensor 111 and a camera sensor 112. Particularly, FIG. 2A is an example of a top view of detection areas of a LiDAR sensor 111 and a camera sensor 112, and FIG. 2B is an example of a side view of detection areas of the LiDAR sensor 111 and the camera sensor 112.

Referring to FIG. 1, the object detecting apparatus according to the exemplary embodiment of the present invention includes a sensor unit 110, an area dividing unit 130, a data analyzing unit 140, and a sensor signal converging unit 150. Further, the object detecting apparatus according to the exemplary embodiment of the present invention may further include at least one of a vehicle information collecting unit 160, a driving unit 170, and a synchronizing unit 120.

The sensor unit 110 generates data including information about an object existing around a vehicle. Particularly, the sensor unit 110 includes the LiDAR sensor 111 and the camera sensor 112. The number of each of LiDAR sensors 111 and camera sensors 112 may be one or more. The LiDAR sensor 111 may measure a speed of an object or a distance to the object by using laser light having a larger Doppler effect than that of microwaves. The camera sensor 112 may generate image data by photographing a surrounding area of the vehicle, in which the object detecting apparatus is provided.

The LiDAR sensor 111 and the camera sensor 112 may be provided at one side of the vehicle. For example, in order to detect an object located at a front side of the vehicle, the LiDAR sensor 111 and the camera sensor 112 may be provided at a center of a front bumper of the vehicle. Otherwise, in order to detect an object approaching a rear side of the vehicle, the LiDAR sensor 111 and the camera sensor 112 may be provided at a center of a rear bumper of the vehicle. Further, the LiDAR sensor 111 and the camera sensor 112 may be mounted at the same position of the vehicle, or mounted while being spaced apart from each other by a predetermined interval.

Each of the LiDAR sensor 111 and the camera sensor 112 has an intrinsic field of view (FOV), so that an FOV1 of the LiDAR sensor 111 may be different from an FOV2 of the camera sensor 112. Particularly, as illustrated in FIG. 2A, the FOV1 of the LiDAR sensor 111 may be included in the FOV2 of the camera sensor 112. By contrast, the FOV2 of the camera sensor 112 may also be included in the FOV1 of the LiDAR sensor 111. Otherwise, it should be understood that the FOV1 of the LiDAR sensor 111 may be the same as the FOV2 of the camera sensor 112, or the FOV1 of the LiDAR sensor 111 and the FOV2 of the camera sensor 112 may partially overlap. Hereinafter, the description will be continuously given on an assumption that the FOV1 of the LiDAR sensor 111 is included in the FOV2 of the camera sensor 112.

The object detecting apparatus according to an exemplary embodiment of the present invention determines whether a dangerous object exists by analyzing a common detection area Ac of the LiDAR sensor 111 and the camera sensor 112. The common detection area Ac may mean the entire area in which the FOV1 of the LiDAR sensor 111 overlaps the FOV2 of the camera sensor 112, but a detection rate of the camera sensor 112 is degraded when an object is closely located within a predetermined distance, so that the common detection area Ac may be set to exclude a proximity area A0, which is an area within a predetermined distance from the vehicle. Hereinafter, the description will be continuously given on an assumption that the common detection area Ac means A1 and A2.

The area dividing unit 130 divides the common detection area Ac of the LiDAR sensor 111 and the camera sensor 112 into a plurality of areas. The area dividing unit 130 may divide the common detection area Ac into a plurality of areas according to a predetermined condition. The condition for dividing the common detection area Ac into a plurality of areas may be defined by using at least one of variables, such as whether the ground is included, an area of the common detection area Ac, a detection angle of the common detection area Ac, a time, a weather condition, a vehicle speed, a road gradient, and a high speed, which may directly/indirectly influence the FOV of the LiDAR sensor 111 or the camera sensor 112.

For example, when an area or a detection angle of the common detection area Ac is large, it is possible to more finely divide the common detection area Ac. In another example, it is possible to further segment the common detection area at a night time rather than a day time. For another example, when a speed of the vehicle is lower, it is possible to further segment the common detection area Ac.

The area dividing unit 130 may also divide the common detection area Ac into an area including the ground and an area not-including the ground. According to the exemplary embodiment of the present invention, the sensor unit 110 may be provided at one side of the vehicle to be spaced apart from the ground by a predetermined distance. Accordingly, as illustrated in FIG. 2B, the area dividing unit 130 may divide the common detection area Ac into a ground non-included area A1 that does not-include the ground and a ground included area A2 that includes the ground. The common detection area Ac is divided into a plurality of areas based on whether the ground is included, so that it is possible to independently perform data processing on an object located on the ground, such as a pavement marker, during a detection of an object. This will be described in detail below. Further, the area dividing unit 130 may divide the ground non-included area A1 or the ground included area A2 into additional sub areas.

The data analyzing unit 140 may analyze LiDAR data to extract a first object information, or analyze image data to extract a second object information. Particularly, the data analyzing unit 140 may receive LiDAR data generated by the LiDAR sensor 111, and when the first object information is included in the LiDAR data, the data analyzing unit 140 may extract the first object information. The first object information relates to information about one or more objects detected in the common detection area Ac by the LiDAR sensor 111. When no objects are in the common detection area Ac, the first object information is not included in the LiDAR data.

The data analyzing unit 140 may receive image data generated by the camera sensor 112, and when the second object information is included in the image data, the data analyzing unit 140 may extract the second object information. The second object information relates to information about one or more objects detected in the common detection area Ac by the camera sensor 112. When no objects are in the common detection area Ac, the second object information is not included in the image data. When an object exists the first object information and the second object information may be information about a location, a size, a speed, or the like of one or more objects located in the common detection area Ac.

The sensor signal converging unit 150 determines whether a dangerous object exists for each of the divided areas of the common detection area Ac based on the first object information or the second object information. That is, the sensor signal converging unit 150 may separately determine whether a dangerous object exists in each of the ground included area A2 and the ground non-included area A1.

In the meantime, a connection line between the respective constituent elements of the object detection apparatus illustrated in FIG. 1 is simply for an illustrative purpose. That is, a uni-directional connection line may be a bidirectional connection line, and some connection lines may be omitted, or more connection lines may be added.

Figure 3:
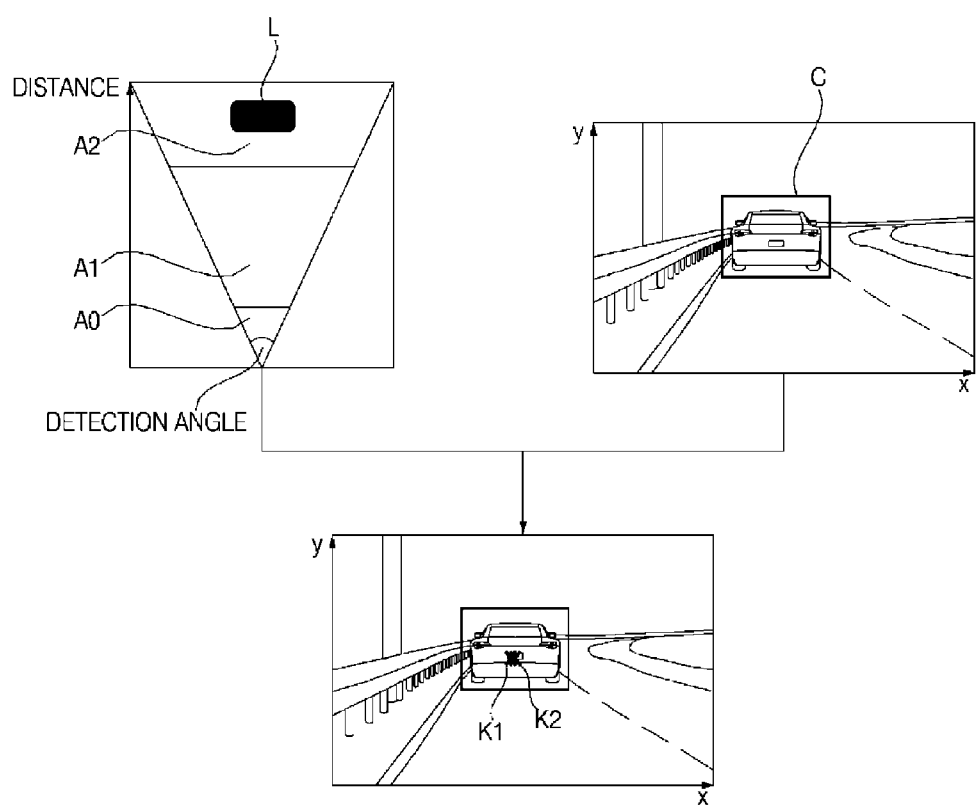
FIG. 3 is a diagram illustrating an example in which the object detecting apparatus according to an exemplary embodiment of the present invention determines whether a dangerous object exists by processing LiDAR data and image data.

FIG. 3 is a diagram illustrating an example in which the object detecting apparatus according to an exemplary embodiment of the present invention determines whether a dangerous object exists by processing LiDAR data and image data. The sensor signal converging unit 150 may include a mapping or coordinate converting module 152 and an object comparing module 154. The mapping or coordinate converting module 152 may convert locations of the objects of the first object information and the second object information into a mutually comparable form. For example, the mapping or coordinate converting module 152 may convert LiDAR data and image data into data about the same predetermined coordinate plane. In this case, the mapping module or coordinate converting 152 may convert the LiDAR data into a form capable of being projected onto an image corresponding to image data.

The object comparing module 154 may compare the first object information L in the LiDAR data with the second object information C included in the image data. For example, referring to FIG. 3, the object comparing module 154 may compare the first object information L included in the LiDAR data and the second object information C included in the image data on a predetermined coordinate plane such as x-y plane. The object comparing module 154 may receive a coordinate value of an object related to the first object information L and a coordinate value of an object related to the second object information C from the mapping module or coordinate converting 152, and compare the two coordinate values, and determine whether a difference between the coordinate values is smaller than a predetermined threshold value. In this case, the coordinate value may be a center coordinate value (K1, K2) of each of the object related to the first object information L and the object related to the second object information C. In the meantime, the object comparing module 154 may determine whether the objects are the same based on various information, such as information on a speed and a size of the object, based on which similarity between the object information included in the LiDAR data and the image data may be calculated, as well as the coordinate values.

Referring to FIG. 3, the sensor signal converging unit 150 may compare the first object information L of the LiDAR data illustrated at a left upper end and the second object information C of the image data illustrated at a right upper end for the region included area A2. Accordingly, the sensor signal converging unit 150 may determine whether the center coordinate values of the objects detected by the LiDAR sensor 111 and the camera sensor 112 correspond to each other as illustrated at a lower end of FIG. 3. As a result of the determination, when the center coordinate values (K1, K2) have a difference smaller than the predetermined threshold value, the sensor signal converging unit 150 may determine that the objects are the same. That is, only when the same object is detected by the LiDAR sensor 111 and the camera sensor 112 in each of the ground non-included area A1 and the ground included area A2, the sensor signal converging unit 150 may determine that a dangerous object exists.

In contrast to the aforementioned exemplary embodiment, when the first object information is extracted from the LiDAR data for the ground non-included area A1 by the data analyzing unit 140, the sensor signal converging unit 150 may determine that a dangerous object exists in the ground non-included area A1. That is, when the first object information is included in the LiDAR data for the ground non-included area A1, the sensor signal converging unit 150 may determine that a dangerous object exists in the ground non-included area A1 even though the second object information is not included in the image data.

Particularly, the camera sensor 112 has a lower object detection rate than that of the LiDAR sensor 111, and has a far lower object detection rate in an environment, such as backlit or a night time conditions. By contrast, an object detection rate of the LiDAR sensor 111 is close to 100%, and may maintain object detection performance at a predetermined level or more even under backlit or night time conditions.

As such, regardless of whether the second object information is included in the image data, when the first object information is included in the LiDAR data, it may be determined that a dangerous object exists in the ground non-included area A1. It is then possible to determine even some objects in the ground non-included area A1, which have not been detected by the camera sensor 112, and thus not been determined as the dangerous objects, as being dangerous objects, thereby finally decreasing a possibility of collision between the vehicle and the object.

In an exemplary embodiment, the sensor unit 110 may adjust an object detection threshold value T of the camera sensor 112. Particularly, the sensor unit 110 may increase or decrease the object detection threshold value T of the camera sensor 112 based on a predetermined sensitivity adjustment condition. For example, when the sensitive adjustment condition is that the LiDAR data has the first object information, if the data analyzing unit 140 extracts the first object information from the LiDAR data, the sensor unit 110 may decrease the object detection threshold value T of the camera sensor 112.

Figure 4A:
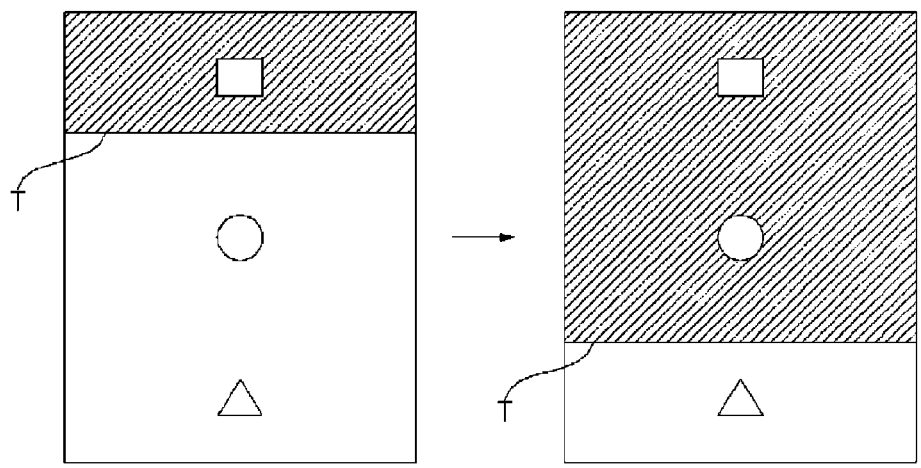
FIGS. 4A and 4B are diagrams illustrating an example in which an object detection rate is changed according to adjustment of an object detection threshold value of the camera sensor according to an exemplary embodiment of the present invention.
Figure 4B:
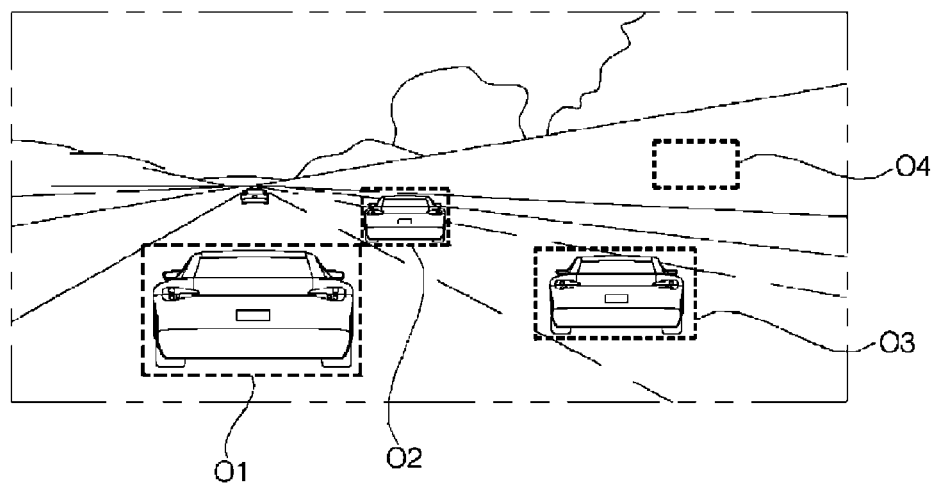

FIGS. 4A and 4B are diagrams illustrating an example in which an object detection rate is changed according to the adjustment of the object detection threshold value T of the camera sensor 112 according to an exemplary embodiment of the present invention.

The object detection threshold value T for detecting an object within the FOV region may be preset in the camera sensor 112. For example, an object, such as another vehicle, having a possibility of colliding with the vehicle may exist within the FOV of the camera sensor 112, and an object, such as a street tree and a soundproof wall, having no possibility or a very slight possibility of colliding with the vehicle may also exist within the FOV of the camera sensor 112. When the second object information is generated by detecting even an object having no possibility or a very slight possibility of colliding with the vehicle, the amount of calculation may be excessively increased and a rate of erroneous recognition may be increased by unnecessary information. The object detection threshold value T of the camera sensor 112 may be preset in the sensor unit 110, so that an object having a value equal to or smaller than the threshold value T may be excluded from a target for generating the second object information. The value preset as the object detection threshold value T may vary based on numerous factors, such as a size, a shape, definition, and the like of an object.

Referring to FIG. 4A an example of a case where the object detection threshold value T is set as a shape of the detected object is illustrated. In the left drawing, a quadrangle is located at an upper part based on the threshold value T and a circle and a triangle are located at a lower part, so that only a quadrangular object is a target for generating the second object information, and a circular object and a triangular object are excluded from the target for generating the second object information. By contrast, in the right drawing, according to a decrease in the object detection threshold value T, even the circular object may be included in the target for generating the second object information.

Referring to FIG. 4B, first to fourth candidate objects O1 to O4 can be seen. Here, it is assumed that the first to third candidate objects O1 to O3 are other vehicles, and the fourth candidate object O4 is a soundproof wall. Before the sensor unit 110 adjusts the object detection threshold value T of the camera sensor 112, only the first and third candidate objects O1 and O3 may be included in the target for generating the second object information. When the sensor unit 110 decreases the object detection threshold value T, the second and fourth candidate objects O2 and O4 may be additionally included in the target for generating the second object information.

In this case, the fourth candidate object O4 is a soundproof wall that is an object having no possibility or a very slight possibility of colliding with the vehicle, therefore even if the fourth candidate object O4 is included in the second object information, the fourth candidate object O4 is not detected in the LiDAR data so that the first object information does not contain detection information about the fourth candidate object O4. Accordingly, if it is set that an object is determined as a dangerous object only when the objects related to the first object information and the second object information are the same as each other, the sensor signal converging unit 150 does not determine that the fourth candidate object O4 is a dangerous object, thereby preventing detection reliability from being degraded.

In an exemplary embodiment, the vehicle information collecting unit 160 may collect speed information about the vehicle. The data analyzing unit 140 may insert relative speed information of an object in the common detection area Ac with respect to the vehicle into the first object information or the second object information based on the speed information about the vehicle.

Figure 5:
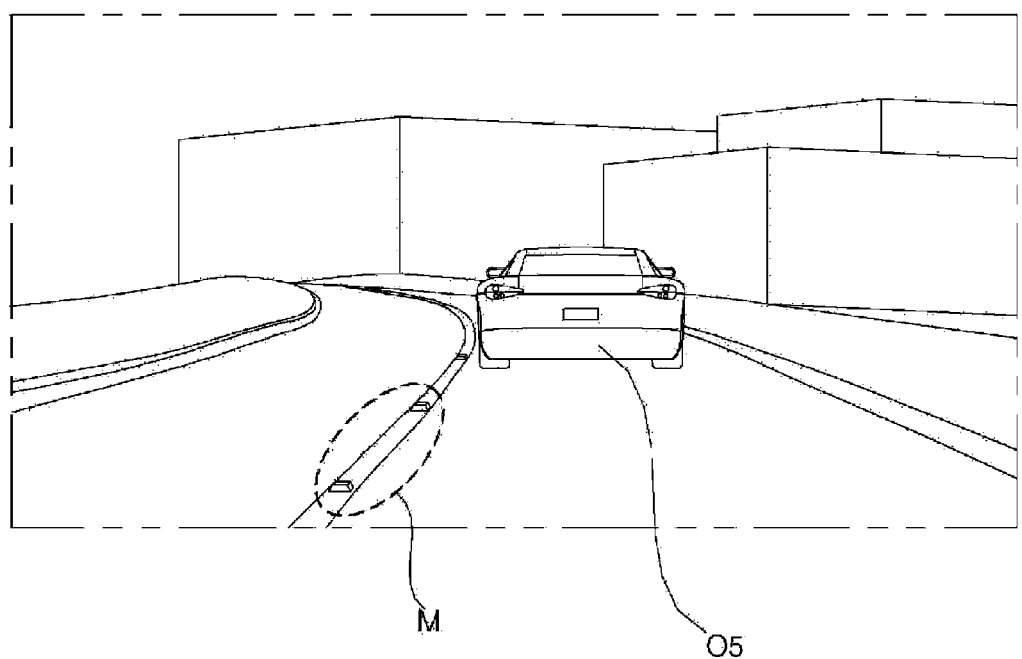
FIG. 5 is a diagram illustrating an example in which whether an object stops or moves is determined based on speed information about a vehicle according to an exemplary embodiment of the present invention.

FIG. 5 is a diagram illustrating an example in which whether an object stops or moves is determined based on speed information about a vehicle according to an exemplary embodiment, and the sensor signal converging unit 150 may determine whether the first object information about the ground included area A2 is related to a stopped object based on the relative speed information. For example, when a relative speed of an object in the first object information is the same as a speed of the vehicle, the sensor signal converging unit 150 may determine that the first object information is about a fixed or stopped object. Further, when it is determined that the first object information about the ground included area A2 is about a moving object, the sensor signal converging unit 150 may determine that a dangerous object exists in the ground included area A2. For example, referring to FIG. 5, the pavement marker M is a structure fixed onto a road, so that the pavement marker M approaches the vehicle at the same relative speed as the speed of the vehicle. Accordingly, the sensor signal converging unit 150 may determine that the first object information about the pavement marker M is related to the stopped object. By contrast, a fifth candidate object O5 is another travelling vehicle, and has the same travelling path as that of the vehicle, so that the sensor signal converging unit 150 may determine that the first object information about the fifth candidate object O5 is related to a moving object.

In this case, when it is determined that the first object information about the ground included area A2 is about a stopped object, the sensor signal converging unit 150 may determine whether a dangerous object exists in the ground included area A2 based on the second object information about the ground included area A2. Particularly, when the second object information about the stopped object is included in the image data, the sensor signal converging unit 150 may determine that a dangerous object exists. By contrast, when the second object information about the stopped object is not included in the image data, the sensor signal converging unit 150 may determine that a dangerous object does not exist in the ground included area A2.

In a further exemplary embodiment, even when the first object information about the ground included area A2 is a stopped object and the second object information about the corresponding stopped object is not included in the image data, the object detecting apparatus according to the exemplary embodiment of the present invention may perform additional data processing of to determine whether the stopped object is a dangerous object.

Particularly, the data analyzing unit 140 may extract lane information included in the image data. The lane information may be extracted by performing image processing, such as an edge detecting method, on the image data (which is a publicly known method, so that a detailed description thereof will be omitted). When the first object information about the ground included area A2 is related to a stopped object, the sensor signal converging unit 150 determines whether a position of the corresponding stopped object is out of a lane boundary. When the first object information is related to the stopped object existing out of the lane boundary, the sensor signal converting unit 150 determines that a dangerous object exists in the ground included area A2. The reason is that there is a high possibility that a stopped object existing within the lane boundary is the pavement marker M, so that it is less necessary to process the stopped object as a dangerous object, but a stopped object existing out of the lane boundary may be located on a travelling path of the vehicle (lane path), so that it is highly necessary to process the stopped object as a dangerous object.

The driving unit 170 and the synchronizing unit 120 are configurations applicable to all of the above mentioned exemplary embodiments.

When the sensor signal converging unit 150 determines that the dangerous object exists, the driving unit 170 drives an AEB system of the vehicle. The driving unit 170 may output only an alarm sound or an alarm message by operating the AEB system of the vehicle, or may control a braking device of the vehicle so that the vehicle is decelerated or stopped even if a driver does not operate a brake.

The synchronizing unit 120 synchronizes the LiDAR data transmitted from the LiDAR sensor 111 and the image data transmitted from the camera sensor 112 based on a time. The LiDAR data and the image data generated at the same time may be sequentially transmitted to the data analyzing unit 140 or the sensor signal converging unit 150. Accordingly, the sensor signal converging unit 150 may determine whether a dangerous object exists for each divided area based on the first object information and the second object information extracted from the synchronized LiDAR data and image data, thereby further improving reliability of object detection.

Figure 6:
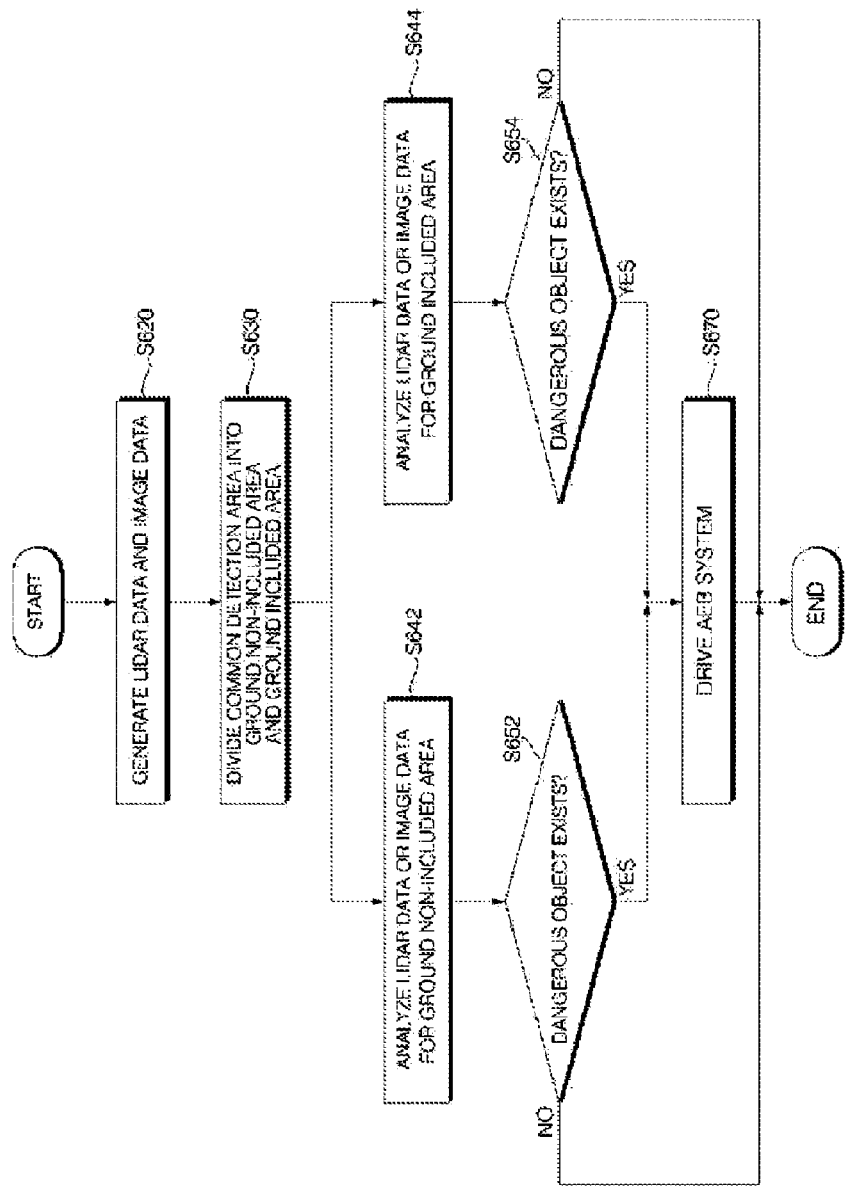
FIG. 6 is a flowchart illustrating an operating method of the object detecting apparatus according to an exemplary embodiment of the present invention.

FIG. 6 is a flowchart illustrating a method of operating the object detecting apparatus according to an exemplary embodiment of the present invention. FIG. 6 illustrates an example applicable to any of the exemplary embodiments of the apparatus.

Referring to FIG. 6, the LiDAR data is generated by using the LiDAR sensor 111, and the image data is generated by using the camera sensor 112 (S620).

Next, the area dividing unit 130 divides a common detection area Ac of the LiDAR sensor 111 and the camera sensor 112 into a plurality of sub areas. A reference for dividing the common detection area Ac into the plurality of sub areas may vary, and for example, the common detection area Ac may be divided into a ground non-included area A1 and a ground included area A2 based on whether a ground is included (S630).

Next, the data analyzing unit 140 analyzes the LiDAR data and/or the image data for each of the ground non-included area A1 and the ground included area A2 (S642 and S644). That is, the data analyzing unit 140 may extract first object information by analyzing the LiDAR data for each area and/or extract second object information by analyzing the image data for each area.

Subsequently, the sensor signal converging unit 150 determines whether a dangerous object exists for each of the ground non-included area A1 and the ground included area A2 based on a result of the analysis by the data analyzing unit 140 (S652 and S654). When it is determined that a dangerous object exists in the ground non-included area A1 or the ground included area A2, the driving unit 170 operates the AEB system of the vehicle (S670).

Figure 7:
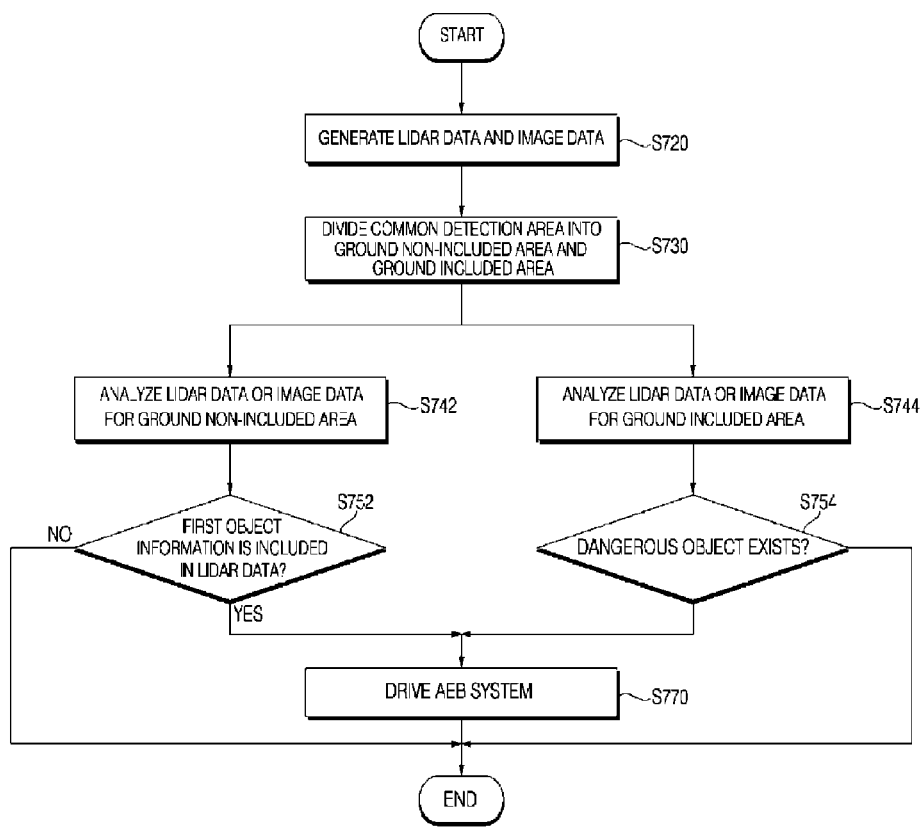
FIGS. 7, 8, and 9 are flowcharts illustrating a method of operating an object detecting apparatus according to another exemplary embodiment of the present invention.

FIG. 7 is a flowchart illustrating a method of operating the object detecting apparatus according to another exemplary embodiment. Operation S752 is different from operation S652 of FIG. 6 in that in the determination by sensor signal converging unit 150 of whether a dangerous object exists in the ground non-included area A1, when the first object information is included in the LiDAR data, may find that a dangerous object exists in the ground non-included area A1 regardless of whether the second object information is included in the image data.

Particularly, the LiDAR sensor 111 may have resolution for a horizontal axis, but may not have resolution for a vertical axis. That is, there is a high possibility that the LiDAR sensor 111 cannot detect an object, such as a pavement marker (M of FIG. 5), having a small height existing in the ground included area A2 unlike the ground non-included area A1. Accordingly, it may be determined that a dangerous object exists in the ground non-included area A1 even though only the first object information of the LiDAR data is extracted, but in case of the ground included area A2, it may be determined that a dangerous object exists only when an object related to the first object information and an object related to the second object information are the same based on the first object information of the LiDAR data and the second object information of the image data.

Figure 8:
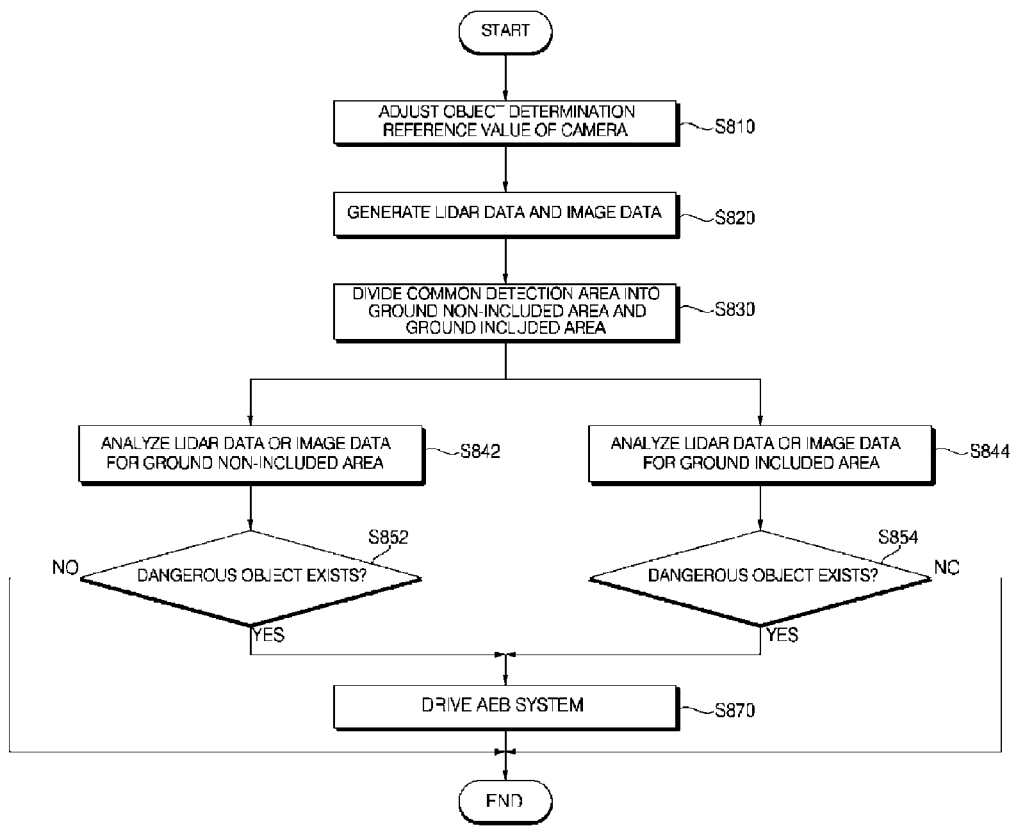

FIG. 8 is a flowchart illustrating a method of operating the object detecting apparatus according to another exemplary embodiment of the present invention. Compared to FIG. 6, an operation of adjusting, by the sensor unit 110, an object detection threshold value T of the camera sensor 112 may be added (S810). In this case, a value preset as the object detection threshold value (T) may vary based on numerous factors, such as a size, a shape, and definition of the detected object.

Figure 9:
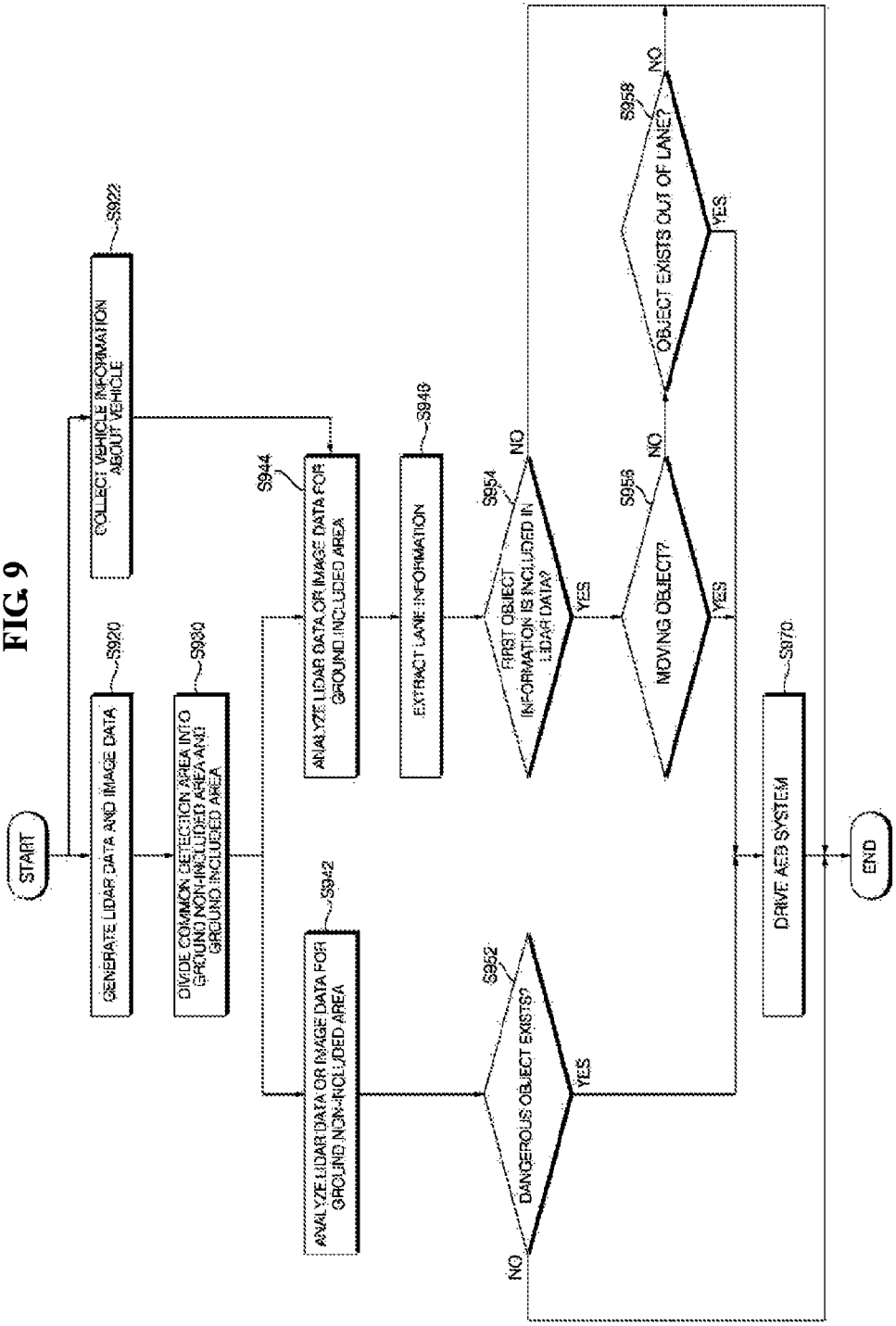

FIG. 9 is a flowchart illustrating a method of operating the object detecting apparatus according to yet another exemplary embodiment of the present invention. Compared to FIG. 6, it is assumed that a process of determining whether a dangerous object exists in the ground non-included area A1 leads to operation of the AEB system.

A process of processing data for the ground included area A2 will be described in detail with reference to FIG. 9. The vehicle information collecting unit 160 may collect speed information about the vehicle (S922), and the data analyzing unit 140 may calculate a relative speed of the object detected in the ground included area A2 based on the speed information about the vehicle. When the first object information is included in the LiDAR data, the sensor signal converging unit 150 determines whether the first object information is related to a moving object or a stopped object based on the relative speed (S956), and only when it is determined that the first object information is related to the moving object, the driving unit 170 may drive the AEB system (S970).

However, according to the fifth exemplary embodiment, even though it is determined that the object related to the first object information is the stopped object, the object related to the first object information may be determined as a dangerous object by additional data processing which is to be described below. Referring to FIG. 9, the data analyzing unit 140 may extract lane information by analyzing the image data (S946), and the sensor signal converging unit 150 may determine whether the object related to the first object information, which is determined as the stopped object, exists out of the lane boundary (S958), such as in the lane path. When the object related to the first object information, which is determined as the stopped object, exists out of the lane boundary and in the lane path, the driving unit 170 may drive the AEB system (S970).

As described above, according to the present invention, when a dangerous object located around a vehicle is detected by using the LiDAR sensor 111 and the camera sensor 112, the entirety or a part of an area, in which the FOV of the LiDAR sensor 111 overlaps the FOV of the camera sensor 112, is set as a common detection area Ac, the common detection area Ac is divided into a plurality of sub areas according to various references, such as whether a ground is included, and an independent data processing method is applied according to a characteristic of a divided sub area, thereby improving an object detection rate and reliability for a detection result.

In exemplary embodiments, the non-sensor elements of the apparatus may be implemented via one or more general purpose and/or special purpose components, such as one or more discrete circuits, digital signal processing chips, integrated circuits, application specific integrated circuits, microprocessors, processors, programmable arrays, field programmable arrays, instruction set processors, and/or the like.

According to exemplary embodiments, the features, functions, processes, etc., described herein may be implemented via software, hardware (e.g., general processor, digital signal processing (DSP) chip, an application specific integrated circuit (ASIC), field programmable gate arrays (FPGAs), etc.), firmware, or a combination thereof. In this manner, the apparatus or one or more components thereof may include or otherwise be associated with one or more memories (not shown) including code (e.g., instructions) configured to cause the apparatus or one or more components thereof to perform one or more of the features, functions, processes, etc., described herein.

The memories may be any medium that participates in providing code to the one or more software, hardware, and/or firmware components for execution. Such memories may be implemented in any suitable form, including, but not limited to, non-volatile media, volatile media, and transmission media. Non-volatile media include, for example, optical or magnetic disks. Volatile media include dynamic memory. Transmission media include coaxial cables, copper wire and fiber optics. Transmission media can also take the form of acoustic, optical, or electromagnetic waves. Common forms of computer-readable media include, for example, a floppy disk, a flexible disk, hard disk, magnetic tape, any other magnetic medium, a compact disk-read only memory (CD-ROM), a rewriteable compact disk (CDRW), a digital video disk (DVD), a rewriteable DVD (DVD-RW), any other optical medium, punch cards, paper tape, optical mark sheets, any other physical medium with patterns of holes or other optically recognizable indicia, a random-access memory (RAM), a programmable read only memory (PROM), and erasable programmable read only memory (EPROM), a FLASH-EPROM, any other memory chip or cartridge, a carrier wave, or any other medium from which information may be read by, for example, a controller/processor.

The above-mentioned exemplary embodiments of the present invention are not embodied only by an apparatus and a method. Alternatively, the above-mentioned exemplary embodiments may be embodied by a program executing functions, which correspond to the configuration of the exemplary embodiments of the present invention, or a recording medium on which the program is recorded. These embodiments can be easily devised from the description of the above-mentioned exemplary embodiments by those skilled in the art to which the present invention pertains.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. An apparatus for detecting an object, comprising:
a sensor unit including a light distance and ranging (LiDAR) sensor configured for collecting LiDAR data and a camera sensor configured for collecting image data;
an area dividing unit configured to divide a common detection area of the LiDAR sensor and the camera sensor into a plurality of areas;
a data analyzing unit configured to analyze the LiDAR data to extract a first object information and analyze the image data to extract a second object information;
a sensor signal converging unit configured to determine whether a dangerous object exists for each of the divided areas based on the first object information and the second object information; and
a vehicle information collecting unit configured to collect speed information about a vehicle,
wherein:
the plurality of areas divided by the area dividing unit comprise a ground non-included area and a ground included area;

the data analyzing unit is configured to insert relative speed information of an object against the vehicle into at least one of the first object information and the second information; and the sensor signal converging unit is configured to determine that a dangerous object exists in the ground included-area when the first object information about the ground included is about a stopped object and the second object information about the stopped object is included in the image data.

2. The apparatus of claim 1, wherein the sensor signal converging unit comprises:
   a coordinate converging module configured to convert the LiDAR data and the image data into data in a coordinate plane; and
   an object comparing module configured to compare the first object information included in the LiDAR data and the second object information included in the image data in the coordinate plane,
   wherein the sensing signal converging unit is configured to determine whether a dangerous objects exists for each of the divided areas based on a result of the comparison.

3. The apparatus of claim 2, wherein when the first object information and the second object information have a difference less than a predetermined threshold value as a result of the comparison, the sensor signal converging unit is configured to determine that a first object and a second object are the same object.

4. The apparatus of claim 2, wherein:
   the first object information is center coordinates of a first object for the coordinate plane; and
   the second object information is center coordinates of a second object for the coordinate plane.

5. The apparatus of claim 1, wherein when the data analyzing unit extracts the first object information from the LiDAR data for the ground non-included area, the sensor signal converging unit is configured to determine that a dangerous object exists in the ground non-included area.

6. The apparatus of claim 1, wherein the sensor unit is configured to adjust an object detection threshold value of the camera sensor based on a predetermined sensitivity adjustment condition.

7. The apparatus of claim 1, wherein:
   the data analyzing unit is configured to insert relative speed information of an object against the vehicle into at least one of the first object information and the second object information; and
   the sensor signal converging unit is configured to determine whether the first object information about the ground included area is related to a stopped object based on the relative speed information, and when it is determined that the first object information is related to the moving object, the sensor signal converging unit is configured to determine that a dangerous object exists in the ground included area.

8. The apparatus of claim 1, further comprising a driving unit configured to operate an autonomous emergency braking (AEB) system of the vehicle when the sensor signal converging unit processes that the dangerous object exists.

9. The apparatus of claim 1, further comprising a synchronizing unit configured to synchronize the LiDAR data transmitted from the LiDAR sensor and the image data transmitted from the camera sensor based on a time,
   wherein the sensor signal converging unit is configured to determine whether a dangerous object exists for each of the divided areas based on the first object information and the second object information when the synchronization is completed.

10. An apparatus for detecting an object, comprising:
    a sensor unit comprising a light distance and ranging (LiDAR) sensor configured for collecting LiDAR data and a camera sensor configured for collecting image data;
    an area dividing unit configured to divide a common detection area of the LiDAR sensor and the camera sensor into a plurality of areas;
    a data analyzing unit configured to analyze the LiDAR data to extract a first object information and analyze the image data to extract a second object information;
    a sensor signal converging unit configured to determine whether a dangerous object exists for each of the divided areas based on the first object information and the second object information; and
    a vehicle information collecting unit configured to collect speed information about a vehicle,
    wherein:
    the plurality of areas divided by the area dividing unit comprise a ground non-included area and a ground included area;
    the data analyzing unit is configured to insert relative speed information of an object against the vehicle into at least one of the first object information and the second object information;
    the sensor signal converging unit is configured to determine whether the first object information about the ground included area is related to a stopped object based on the relative speed information, and when it is determined that the first object information is related to the moving object, the sensor signal converging unit is configured to determine that a dangerous object exists in the ground included area;
    the data analyzing unit is configured to extract lane path and boundary information included in the image data; and
    when the first object information for the ground included area is related to a stopped object existing out of the lane boundary and in the lane path, the sensor signal converging unit determines that a dangerous object exists in the ground included area.

11. A method of operating an apparatus for detecting an object, comprising:
    generating light distance and ranging LiDAR data by using a LiDAR sensor;
    generating image data by using a camera sensor;
    dividing a common detection area of the LiDAR sensor and the camera sensor into a ground non-included area and a ground included area;
    analyzing at least one of the LiDAR data to extract first object information and the image data to extract second object information;
    determining whether a dangerous object exists for each of the ground non-included area and the ground included area based on a result of the analysis;
    operating an autonomous emergency braking (AEB) system of a vehicle when it is determined that the dangerous object exists; and
    collecting speed information about a vehicle,
    wherein the determining comprises determining whether the first object information included in the LiDAR data for the ground included area is related to a stopped object based on the speed information about the vehicle, and determining that a dangerous object exists in the ground included area when the first object information is related to a moving object.

12. The method of claim 11, wherein the step of determining comprises determining that a dangerous object exists in the ground non-included area when the first object information is included in the LiDAR data for the ground non-included area.

13. The method of claim 11, wherein the step of determining comprises determining that a dangerous object exists in the ground included area when an object related to the first object information and an object related to the second object information are the same based on the first information of the LiDAR data and the second object information of the image data.

14. The method of claim 11, further comprising adjusting an object detection threshold value of the camera sensor based on a predetermined sensitivity adjustment condition.

15. The method of claim 11, wherein:
the analyzing comprises extracting lane boundary information included in the image data; and
the determining comprises determining that a dangerous object exists in the ground included area when the first object information included in the LiDAR data for the ground included area is a stopped object existing out of a lane boundary.

16. A method of operating an apparatus for detecting an object, comprising:
generating light distance and ranging LiDAR data by using a LiDAR sensor;
generating image data by using a camera sensor;
dividing a common detection area of the LiDAR sensor and the camera sensor into a ground non-included area and a ground included area;
analyzing at least one of the LiDAR data to extract first object information and the image data to extract second object information;
determining whether a dangerous object exists for each of the ground non-included area and the ground included area based on a result of the analysis;
operating an autonomous emergency braking (AEB) system of a vehicle when it is determined that the dangerous object exists; and
collecting speed information about a vehicle,
wherein the step of determining comprises determining that a dangerous object exists in the ground included area when the first object information about the ground included area is about a stopped object and the second object information about the stopped object is included in the image data.

* * * * *